US007158843B2

(12) United States Patent
Smith

(10) Patent No.: US 7,158,843 B2
(45) Date of Patent: Jan. 2, 2007

(54) MODULAR SOFTWARE DEFINABLE PRE-AMPLIFIER

(75) Inventor: Graeme R Smith, Lancashire (GB)

(73) Assignee: Akya Holdings Limited, Dublin 2 (IE)

( * ) Notice: Subject to any disclaimer, the term of this patent is extended or adjusted under 35 U.S.C. 154(b) by 626 days.

(21) Appl. No.: 09/888,572

(22) Filed: Jun. 26, 2001

(65) Prior Publication Data

US 2002/0000831 A1 Jan. 3, 2002

(30) Foreign Application Priority Data

Jun. 30, 2000 (GB) ................................ 0015943.4

(51) Int. Cl.
*G06F 17/00* (2006.01)
*G06F 3/00* (2006.01)

(52) U.S. Cl. .......................... 700/94; 381/61; 381/120; 703/4

(58) Field of Classification Search ................ 381/119, 381/98, 111, 120, 61; 700/94; 330/10; 703/3, 4
See application file for complete search history.

(56) References Cited

U.S. PATENT DOCUMENTS

| | | | | |
|---|---|---|---|---|
| 3,931,474 | A * | 1/1976 | McLaughlin et al. | 379/257 |
| 4,672,671 | A | 6/1987 | Kennedy | |
| 5,339,362 | A | 8/1994 | Harris | 381/86 |
| 5,467,400 | A * | 11/1995 | Keir | 381/61 |
| 5,546,273 | A | 8/1996 | Harris | 361/697 |
| 5,630,175 | A | 5/1997 | Gajewski et al. | 710/72 |
| 5,706,179 | A | 1/1998 | Palatov | 361/788 |
| 5,765,027 | A * | 6/1998 | Wang et al. | 710/40 |
| 5,801,921 | A | 9/1998 | Miller | 361/686 |
| 5,887,165 | A | 3/1999 | Martel et al. | |
| 5,937,070 | A * | 8/1999 | Todter et al. | 381/71.6 |
| 6,064,743 | A * | 5/2000 | Suggs | 381/104 |
| 6,107,876 | A * | 8/2000 | O'Brien | 330/10 |
| 6,278,784 | B1 * | 8/2001 | Ledermann | 381/58 |
| 6,353,169 | B1 * | 3/2002 | Juszkiewicz et al. | 84/600 |
| 6,405,189 | B1 * | 6/2002 | Gillis | 707/3 |
| 6,617,928 | B1 * | 9/2003 | Finlay et al. | 330/288 |
| 7,043,023 | B1 * | 5/2006 | Watanabe et al. | 380/270 |
| 2002/0181612 | A1 * | 12/2002 | Warble et al. | 375/297 |

FOREIGN PATENT DOCUMENTS

| | | |
|---|---|---|
| GB | 2 333 626 A | 7/1999 |
| GB | 2 347 009 | 8/2000 |

(Continued)

OTHER PUBLICATIONS

Merriam-Webster's Collegiate Dictionary, 2000, Merriam-Webster, Incorporated, Tenth Edition, p. 970.*

*Primary Examiner*—Xu Mei
(74) *Attorney, Agent, or Firm*—Browdy and Neimark, PLLC

(57) ABSTRACT

Pre-amplifier apparatus, for use for example in a home hi-fi system, compoosed of one or a plurality of reconfigurable circuits used to configure the apparatus to implement the desired audio processing functions and audio protocols for use in different audio systems. The reconfigurable circuits are configured and reconfigured in real time. The apparatus is also modular allowing expansion through the use of mezzanine and or PC cards, which contain, amongst other things, signal processing logic and programmable logic. All signal processing is performed in the digital domain so any analogue input signals are first converted to digital signals using an analogue to digital converter. Remote audio feedback to the apparatus allows the apparatus to adapt in real time to the desired acoustic settings.

31 Claims, 7 Drawing Sheets

FOREIGN PATENT DOCUMENTS

| | | |
|---|---|---|
| WO | 97 02570 | 1/1997 |
| WO | 97 23818 | 7/1997 |
| WO | WO 99/38324 A1 | 7/1999 |
| WO | WO 01/67448 | 9/2001 |

* cited by examiner

MODULAR SOFTWARE DEFINABLE PRE-AMPLIFIER

BACKGROUND TO THE INVENTION

This invention relates to a modular software definable pre-amplifier.

Pre-amplifiers are fixed units that implement signal conditioning for several input formats. The type and level of signal conditioning is limited and tends to be performed in the analogue domain. This tends to introduce unwanted affects in terms of noise and signal distortion. Manipulating signals in the digital domain provides improved performance. For example, digital filters have the following advantages over their analogue counterparts;

- they do not drift,
- linear phase characteristics are possible,
- they can handle low frequency signals,
- the frequency response characteristics can be made to approximate closely to the ideal,
- the accuracy of the filter may be controlled by selecting the appropriate word length.

Many of today's music formats are produced and stored in the digital domain. There is also an increasing array of media types and device to play them; compact disc players, Digital Versatile Disc (DVD), MP3 players, Mini-Disc player, Digital Audio Tape (DAT). There are currently several data formats MPEG 2, MP3 and new formats are being introduced or planned, such as MPEG 4 audio. This makes it difficult for consumers to keep up to date with new technology. New standards are constantly being developed e.g. MPEG4 and MP3, which means equipment can quickly become obsolete requiring the consumer to purchase new units if a new media type is adopted. Also the interfaces between units can change so interconnection between legacy equipment means that the units are incompatible. With the introduction of new media formats new systems require interface upgrades, which requires changing more than the interfaces, usually a whole system element needs to be replaced and new hardware and software installed. In fact, interfacing between system elements can be one of the most complex problems to overcome as many new interfaces rely on software protocols to implement their functionality. For example Universal Serial Bus (USB), Firewire (1394 standard) and UTOPIA Level 2 interfaces.

Being able to swap between the different formats without having to substitute whole equipment units would be a great advantage and cheaper for the consumer.

Interconnection between the various equipment boxes requires many cables and tends to be unwieldy. It also means that a pre-amplifier unit is dedicated to the system to which it is attached. Other remote devices cannot access the facilities provided by the pre-amplifier apparatus.

BRIEF SUMMARY OF THE INVENTION

The present invention is for solving the above mentioned and related problems.

According to the present invention there is a modular and software definable pre-amplifier apparatus comprising:

- one or a plurality of reconfigurable circuit means, which are configured and reconfigured in real time under the control of software or firmware configuration data means to implement in hardware different signal processing sub-functions required for different digital signal processing algorithms and or audio processing protocols, the reconfigurable circuit means being reconfigured during device operation by the configuration data stored in local memory associated with each reconfigurable logic block and at a rate that ensures that one or a plurality of selected algorithms complete their tasks in the required time event.

With such apparatus, manufacturers will be able to provide card modules for the different system functions. Users will then be able to "construct" a pre-amplifier apparatus and use existing card modules to build new configurations. As the card modules and or mezzanine cards incorporate programmable interfaces, a user will be able to easily add new functions and upgrades to the system by simply replacing, memory devices, mezzanine cards or individual card modules. As the backplane can transfer data of different format by encapsulation techniques, it will be easy to add new formats. The backplane is based on high-speed differential serial connections (up to 600 Mega-bits per second). This facility provides adequate means for future system performance. Of course, new, higher speed interface could easily be added to a card module to incorporate future high-speed inter-card module communications.

In another embodiment, certain system functions can be performed in software and or firmware. These types of functions include for example, digital filters, codecs, digital signal processing algorithms such as Fast Fourier Transforms (FFTs), Inverse Fast Fourier Transforms (IFFTs), noise reduction, surround sound algorithms, encryption and authentication.

To perform these functions the software is run on microprocessors, Digital Signal Processors (DSPs), Reduced Instruction Set Computers (RISCs). This concept allows different sub functions required to form parts of the overall desired entertainment system to be implemented in software and run on a microprocessor. To allow for maximum flexibility, several processors and associated memory and Input-Output peripheral devices can be provided on a single card module. As different entertainment systems require different sub-functions, the host controller can allocate the various software sub functions to various processors as necessary. For example, depending on the capabilities of the processor and the required functionality, a processor could run several software sub functions if the processing time permits and they are effectively sequential operations or the host controller could allocate different software sub functions to different processors and perform the required group of tasks in parallel.

This concept can be extend to include implementing system sub functions in programmable logic. The use of programmable logic, such as Field Programmable Gate Arrays (FPGAs), is sometime required to implement more complex and time consuming algorithms, which are better, suited to hardware implementation. This gives rise to the concept of "Software Definable Systems" or SDS. However, the use of programmable logic still requires the host controller to download firmware to program the programmable device to implement the desired sub function or sub functions required in the overall system configuration.

The fact that Software Definable Systems (SDS) provided the greatest flexibility (functional re-use and system re-configuration) in system design means that it is expandable and easily upgradeable. The processor card module can have mezzanine card slots to allow the addition of more processors when a system needs to be expanded. The use of Plug'n'Play facilities means that the host processor can automatically determine the number and capabilities of the processors and or programmable logic devices available and hence allocate the desired resources accordingly.

Such a system can download new software and or firmware functions or upgrade existing functions from the Internet via the internal 3M modem module or external modem module 1M.

A specific embodiment of the invention will now be described by the way of example with reference to the accompanying drawings, in which:—

DETAILED DECRIPTION OF THE INVENTION

In a preferred embodiment of the invention the pre amplifier apparatus uses one or more software and or firmware definable logic blocks to implement audio processing functions. These logic blocks can be based on any combination of DSP, programmable logic, such as FPGAs, memory to store programs, data and configuration parameters. The logic blocks and devices are configured by the host processor based on the selected audio processing algorithm or algorithms required for a particular input output combination. These algorithms include MPEG2 audio processing for layers 1, 2 and 3 (MP3), AC3, Dolby Noise Reduction, Surround sound systems, 3D sounds, Home Theatre and the like. Having programmable logic and processing arrays allows the host processor to configure the logic blocks and devices so certain audio processing functions can be efficiently allocated to the different blocks. In some cases, where processors and programmable logic devices operate at high frequencies, these logic blocks can implement several different algorithms by being re-configured in real time to perform multi-tasking. The control algorithms being stored in local memory at initialisation by the host processor. Examples of programmable logic to implement these functions include the FLEX and MAX series of devices from ALTERA. Configuration can also be stored locally in configuration EPROMs, such as the EPC1064. Having the program and re-configuration data stored locally is more efficient and doesn't become a processing burden on the host processor which would have to be a powerful processor operating at many MIPS to cater for all the interrupts and reconfiguring of the logic blocks during operation.

In addition, the use of Application Specific Integrated Circuits (ASICs) and System On a Chip (SOC) technology allows the integration of both programmable logic, standard cell logic, processing cores, such as RISC cores, and analogue functions. The software definable/re-configurable circuitry employed in the pre-amplifier apparatus 2 can also be based on this type of device technology as it can reduce device count and system costs.

Figure 1:
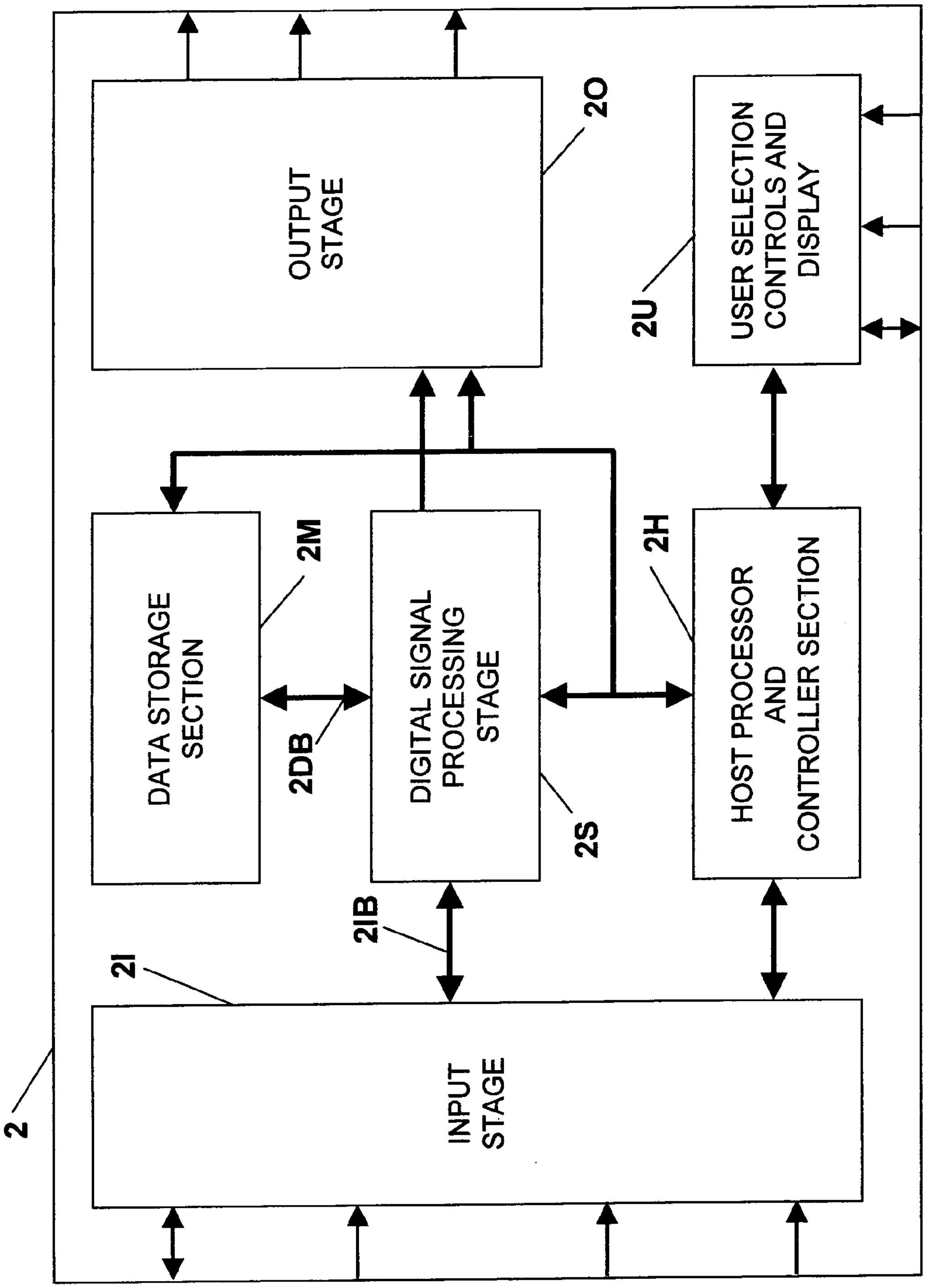
FIG. 1 shows a logical block diagram of the pre-amplifier apparatus and how the sub blocks are interconnected.

The pre-amplifier apparatus 2 is made up from several sub-blocks. FIG. 1 outlines the interconnection of the various sub-blocks, which make up the pre-amplifier apparatus 2. These are the input stage module 2I, the digital signal processing stage 2S, the data storage section 2M, the User selection controls and display 2U, the host processor and controller section module 2H and the output stage module 2O.

Figure 2:
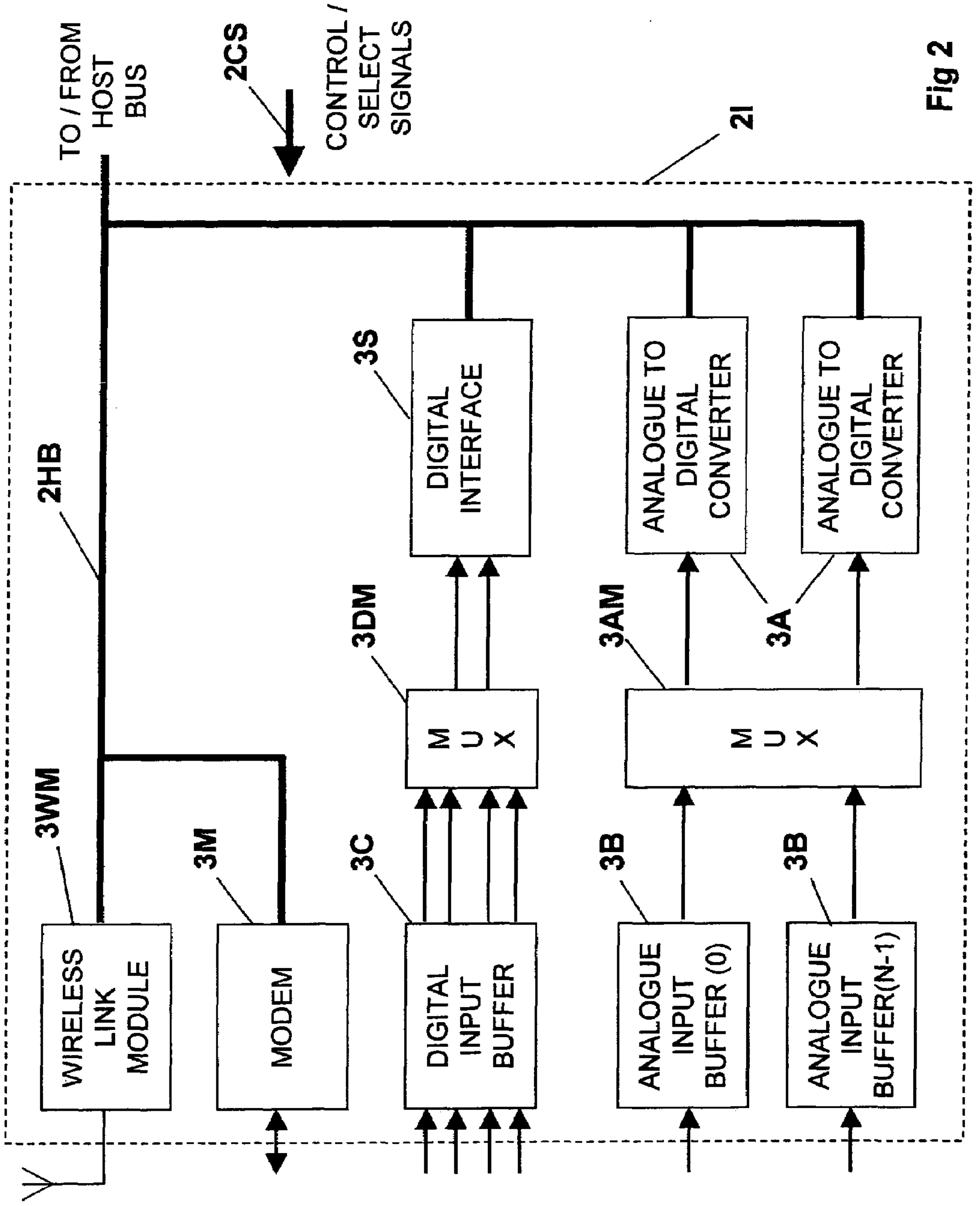
FIG. 2 shows a logical block diagram of input stage module.
Figure 7:
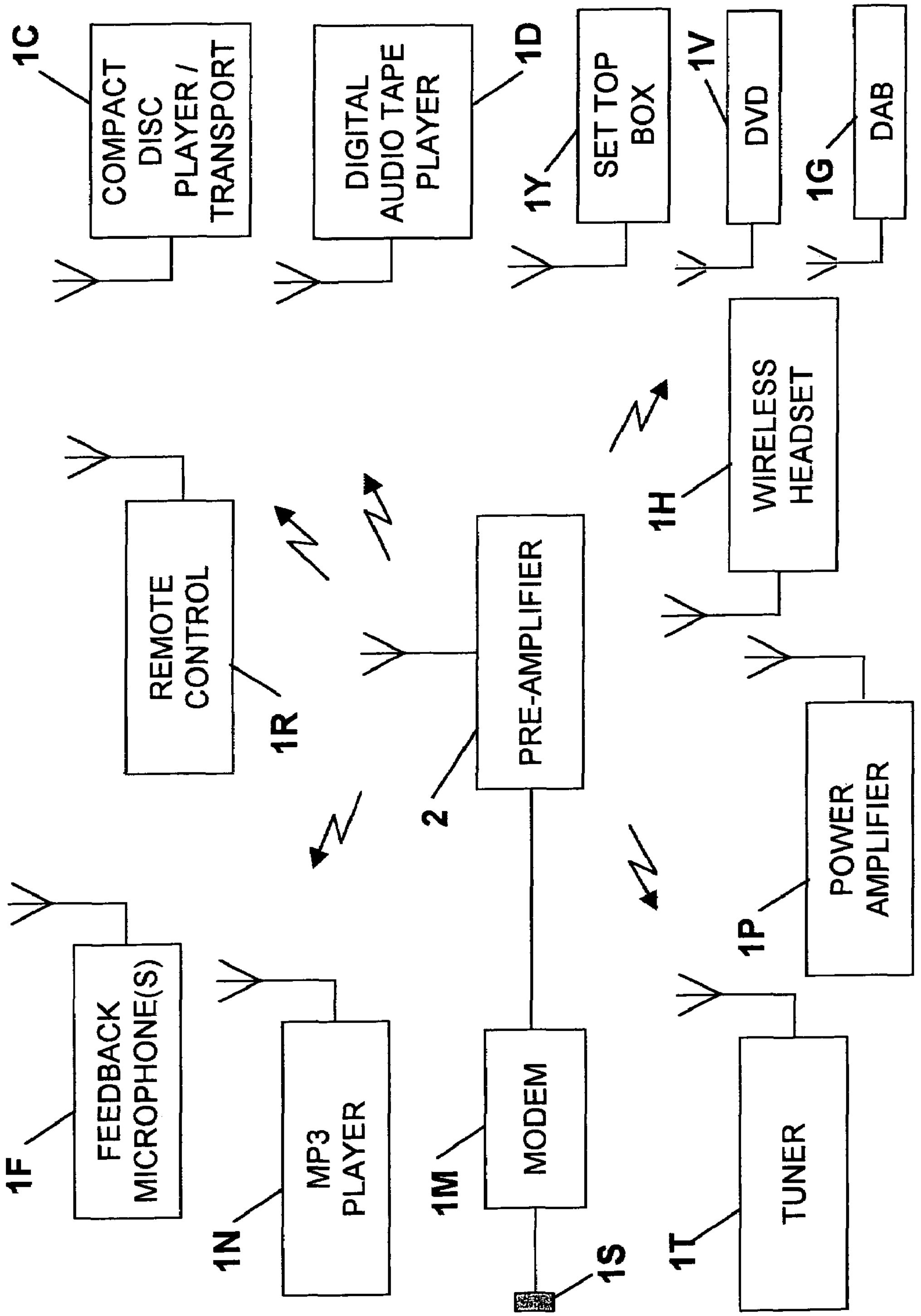
FIG. 7 illustrates an example of an overall system in which communications between the pre-amplifier and other devices is by wireless means.

A block diagram of the Input Stage module 2I is shown in FIG. 2. The input stage sub-block or module 2I contains the circuitry to interface peripheral devices to the pre-amplifier 2. These devices include, but are not limited to, a remote control unit 1R, a compact disc player or transport 1C, a Digital Audio Tape (DAT) player 1D, an MP3 player 1N, an external modem 1M a tuner 1T and microphones 1F. FIG. 7 shows a system example of how the pre-amplifier 2 uses wireless communication links to transfer data between itself and peripheral devices. However, the connection between the pre-amplifier 2 and the peripheral devices in the system do not have to be by wireless means and can be by cable means. Though several peripheral devices are shown in FIG. 7, this does not exclude other devices such as a tape cassette player or a signal from a record turntable unit.

Input signals from a peripheral device, such as a compact disc player or transport 1C can be either an analogue format or a digital format. As all signal processing is performed in the digital domain any analogue signals have to be first converted into the digital domain using analogue to digital converters (ADCs) 3A. The analogue to digital converters (ADCs) 3A will have the data resolution, sampling rate and other characteristics to correctly translate the analogue signals to digital signals without introducing any noise or aliasing affects. Though different systems use different resolutions the ADCs 3A should have a minimum resolution of 16 bits and a maximum resolution of 24 bits. Devices include the Burr Brown PCM1700 or Crystal Semiconductor CS5394. Analogue signals are first buffered, amplified and filtered 3B. These signals are then passed to the analogue to digital converters 3A via an analogue multiplexer 3AM. Several analogue input buffer circuits 3B can be used, one for each analogue peripheral device.

Signal source selection from the analogue input buffers 3B to the input of the analogue to digital converters 3A is controlled by the host processor 7H based on user inputs. The apparatus 2 could have several separate digital serial interfaces, which are applied to a multiplexer. The output of the multiplexer being determined by the selector input. This value is read by the host processor, which then writes a value to the multiplex register (not shown) to select the correct input. The multiplexer register being address mapped.

Digital signals are also buffered using a digital buffer 3C before being input to the digital interface 3S. Source selection to the digital interface 3S is via the digital multiplexer 3DM and is controlled by the host processor 7H based on user inputs. The digital interface 3S performs data formatting and decoding for various digital audio protocols for both transmit and receive data. An example of such a circuit is the CS8427 from Crystal Semiconductors.

The Input stage 2I can optionally have the facilities to allow a modem 3M to be connected to the apparatus 2. The modem 3M could be an Asymmetrical Digital Subscriber Line (ADSL) modem or cable modem or a low speed modem (say a V.90 compliant modem) for example and takes the form of a PCMCIA or PC card which can be inserted into a PC TYPE1/2 or 3 slot located on the apparatus 2. The software required to initiate, establish and control an Internet link is performed by the host processor and controller section 2H. Employing a module approach as in the described apparatus allows upgrades to higher performance systems easily and cheaply and access to new media types.

Data received from the various signals sources is output onto the host bus 2HB after being processed by the relevant input circuitry. Commands to configure and select the input circuitry are transferred from the host processor and controller section 2H via the Control/Select bus 2CS. Alternatively, local decoding can be performed by decoding information presented on the control bus 2CS.

In a further embodiment communication between the pre-amplifier apparatus 2 and the peripheral devices is by wireless means. This alleviates the need for expensive and cumbersome connection cables between the various signal source devices or peripherals. However, the use of wireless communications between the apparatus 2 and peripheral devices doesn't preclude the use of wired connections. Module 3WM is a wireless link module which is used to allow digital data from a peripheral device, such as a compact disc player 1C to be received by the pre-amplifier 2. These wireless links can be bi-directional allowing two-way communications between the pre-amplifier 2 and any of the peripheral devices. Such information could include control data to control the peripheral device via the pre-amplifier 2 using a "universal" remote control unit 1R, which would be used to select a new track for example. The wireless module 3WM can be integrated as part of the apparatus 2 or be a removable module, similar to a PC TYPE 1, 2 or 3 card or mezzanine card. These self-contained modules would be easily inserted and removed from the apparatus 2 making then very user friendly. The use of "Plug'n'Play" technology means that at start-up, the host processor 7H will perform a routine to search and establish what hardware is available in the apparatus 2 and configure the apparatus 2 accordingly.

Figure 6:
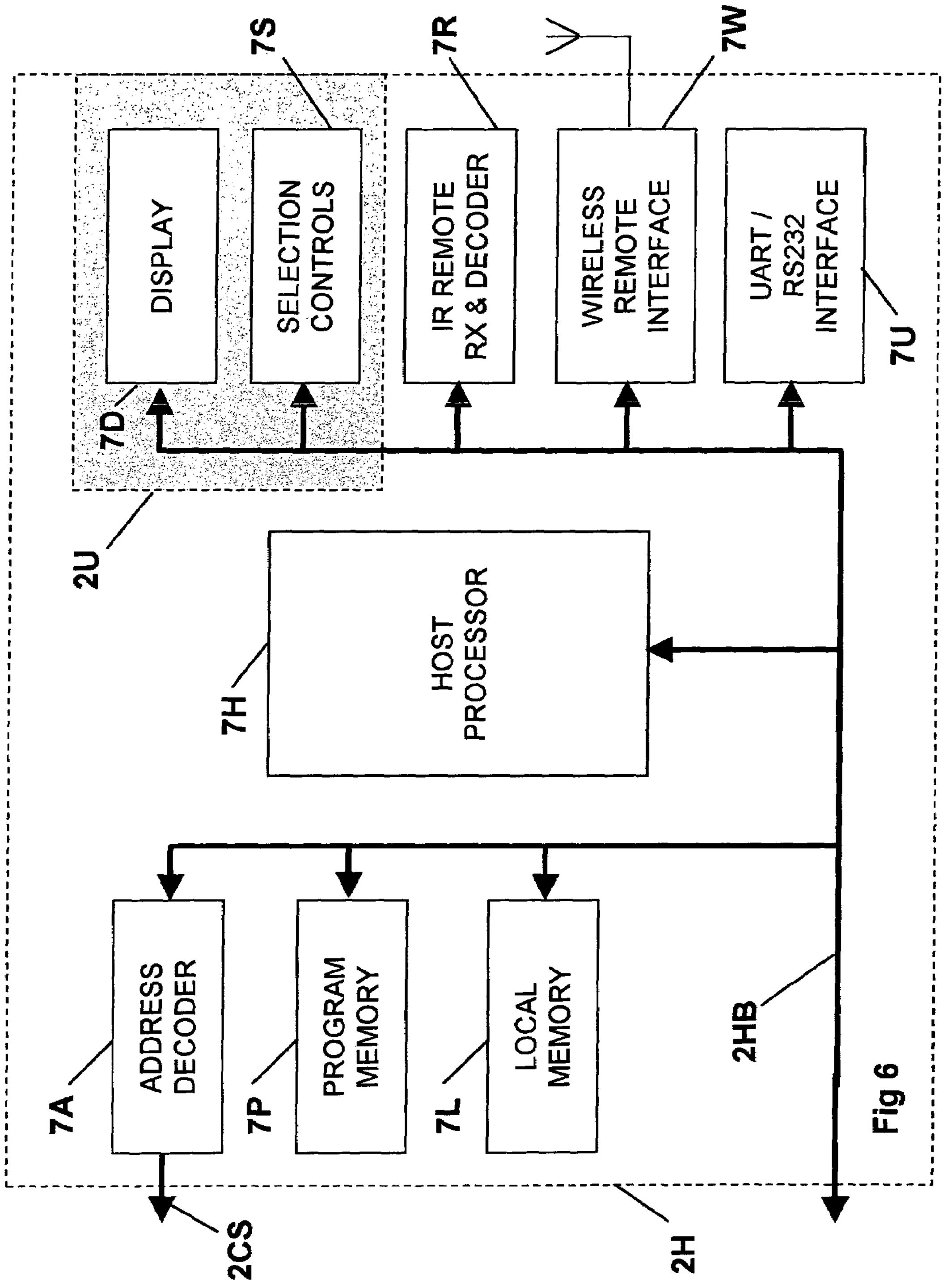
FIG. 6 shows a logical block diagram of the host processor and controller section of the pre-amplifier.

The host processor and controller section 2H performs all the 'housekeeping' tasks including reading values input via the input selection controls and display circuitry 2U. The updated and selected values being displayed on display means 7D, such as an LCD display 7D. FIG. 6 shows a block diagram of the host controller and controller section 2H together with the user selection controls and display module 2U. An Infra-red remote control interface 1R allows user commands to be received, demodulated, decoded and passed to the host processor 7H. These values being transferred to the corresponding logic block or blocks so they can be used by the audio processing algorithms. Communication between the pre-amplifier apparatus 2 and the remote control means 1R can be either an infra red protocol, such as IrDA or a wireless protocol such as Bluetooth. In the latter cases, a wireless remote interface 7W will be required. However, as wireless protocols such as Bluetooth and HomeRF allow multiplexing of several channels only one wireless module 7W is required for the basic system. Due to the modular nature of the apparatus 2 more wireless modules 7W or 3WM can be added if necessary to implement more complex multi-channel systems.

Any system configuration will require a control means to initialise, control and monitor system performance. This will be provided by the host processor and controller section 2H. Software driver routines to control the various card functions will be stored in non-volatile program memory means 7P, such as FLASH Memory. FIG. 6 shows a logical block diagram of a Host Processor and controller section 2H, which incorporates the display 7D and the remote control functions 7R and 7W. Selecting the desired system configuration and modifying the variable parameters, such as volume and tuning, is either by front panel controls or via a Hand-Held Remote Control unit 1R. Instructions are transmitted to the pre-amplifier apparatus 2 using an infra red link. These signals are received and decoded by the 1R remote control receiver and decoder 7R. Chosen parameters are consequently displayed on the LCD display 7D. Reception of signals or changes to front panel settings causes an interrupt to the Host Processor 7H. The host processor 7H services the interrupt and updates the corresponding system parameters by addressing the relevant function and writing the relevant data to the appropriate control registers. In the case of the display 7D and remote control circuitry 7R/7W, data is passed to the host processor 7H via host bus means 2HB.

The various programs to implement the different algorithms and configure the logic blocks are stored in host program memory 7P. This has the advantage that the processor 7H can allocate the different sub programs to different logic blocks depending on the number and type used in the pre-amplifier apparatus 2. The host processor 7H will at start-up or initialisation "interrogate" the various logic blocks to discovery what type and how many logic blocks are available in the system so it can determine how to efficiently configure the system to perform the selected audio processing algorithms and or protocols. Also, certain card modules or mezzanine modules will incorporate Plug'n'Play means, which allows card modules to initialise and or assist in configuring themselves.

Local memory 7L is used by the host processor 7H for storing parameters and variable used in processing. The address decoder circuitry 7A is used to decode addresses placed on the host bus 2HB by the host processor 7H and generate chip select signals for the various logic blocks in the apparatus 2.

The address decode circuitry 7A is shown in FIG. 7 as a local block, but the address decoding could be performed elsewhere in the apparatus 2. For example, each section could employ its own address decoding (not shown). To allow a Personal Computer (PC) to be connected to the apparatus 2 a UART/RS232 interface 7U is provided (Maxim MAX202) for example. This could be used to control the apparatus 2, or perform diagnostic testing, or download new audio protocol algorithm to the host program memory 7P via the host processor 7H for example. Though an RS232 interface is shown in FIG. 7 other interfaces could be used, such as a Universal Serial Bus (USB) interface or a Firewire interface.

Figure 3:
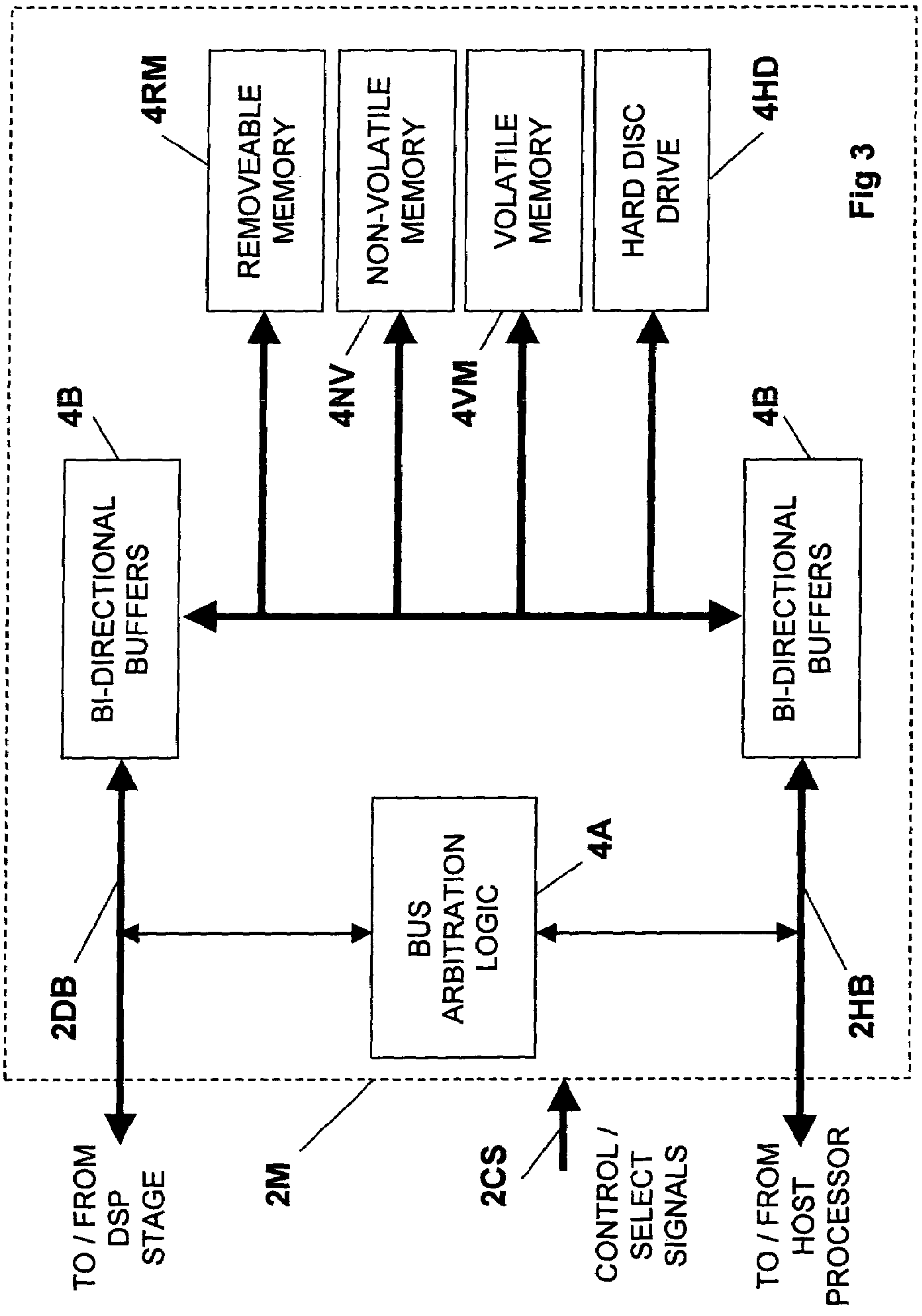
FIG. 3 shows a logical block diagram of the data storage section.

Though the apparatus 2 allows "music data" to be sourced in various formats from peripheral devices, such as a compact disc player 1C or a radio tuner 1T for example, the pre-amplifier apparatus 2 also has the facilities to store, retrieve and processes "music data" stored internally on a hard disk drive 4HD, non-volatile memory 4NV, volatile 4VM and removable memory cards 4RM. The hard disk drive 4RM can take the form of a magnetic disk drive or an optical disk drive, such as a compact disk or Digital Versatile Disc (DVD). These can also be read/write-able allowing stored or edited "music data" to be stored on the magnetic and or optical disk media. FIG. 3 shows a block diagram of the data storage section 2M and how access to the various memory blocks is achieved. Access to the data storage section 2M is via two ports, namely the digital signal processing stage 2S and the host processor and controller section 2H. Therefore, the memory in the data storage section 2M is considered dual port and arbitration logic 4A is required to control access to the memory in the data storage section 2M. This will take a conventional form of having bus request and bus grant signals. Arbitration will however ensure no one block has more than its fair share of accesses to the memory by locking out the other processor.

This data will be compressed to reduce memory storage. The compression algorithms include MP3 and MPEG4 audio compression. This "music data" will be written to the hard disk drive 4HD under the control of the host processor 7H. The source of the "music data" can be from the peripheral device or more likely from the Internet via an internal modem means 3M. For example, the user would open an Internet connection using the apparatus 2 and modem 3M. The selected MP3 data would be downloaded from the Internet and stored on the hard disc drive 4HD or non-volatile memory 4NV or volatile memory 4VM or removable memory card 4RM. This data would be passed to the data storage section 2M via the host bus 2HB. The host processor 7H having to arbitrate (bus arbitration logic 4A) to access the memory. To isolate the non accessing processor from data being either stored or retrieved from internal memory by the accessing processor, bi-directional tri-state buffer 4B are employed. This latter arrangement allows both the host processor 7H and the digital signal processing stage 2S to operate in parallel and both gain access to the data storage section 2M.

In another embodiment, the apparatus 2 has slots, such as PC TYPE 1/2/3 slots or "memory stick" slots to allow the user to insert removable memory cards 4RM into the apparatus 2. These removable memory cards contain previously stored "music data" which can then be read, processed and played by the apparatus 2. Or new "music data" can be stored onto the removable memory card 4RM by the apparatus 2 so it can be used in other apparatus.

The pre-amplifier apparatus 2 can be programmed to record data from various sources, such as a radio program, at a predefined time allowing the user to retrieve and listen to the stored data at a later date. The data to be recorded is stored on the hard disk drive 4HD or non-volatile memory 4NV.

Once the user has selected the "music data" source the pre-amplifier apparatus 2 needs to process the "music data" and output the data streams to a power amplifier 1P or wireless headset 1H. The processing required depends on the format of the source data and the settings of the tone controls. Data from a magnetic cartridge will first need to be equalised and filtered. Likewise, digital data streams from a compact disc transport 1C will need digital filtering before being output to a power amplifier 1P. Compressed audio data, such as MP3, MPEG layer 2 and MPEG 4 audio data will need to be decoded and processed. Likewise, any noise reduction schemes, such DOLBY© or tonal changes, volume and balance setting will need to be calculated and applied to the source data before being output from the pre-amplifier apparatus 2. Providing standard logic circuitry to process the various formats would be expensive and unwieldy. Employing programmable logic, such as FPGAs and digital signal processors would allow the same hardware to be re-configured to implement and process the selected data format and protocols. This is also true for the input and or output interfaces. Another advantage of employing programmable devices means that upgrades are easily implemented and the apparatus can be configured to use new data formats or interfaces. This concept of "Software Definable Systems" means the pre-amplifier apparatus is more "future proof" and shouldn't become obsolete as quickly.

Figure 5:
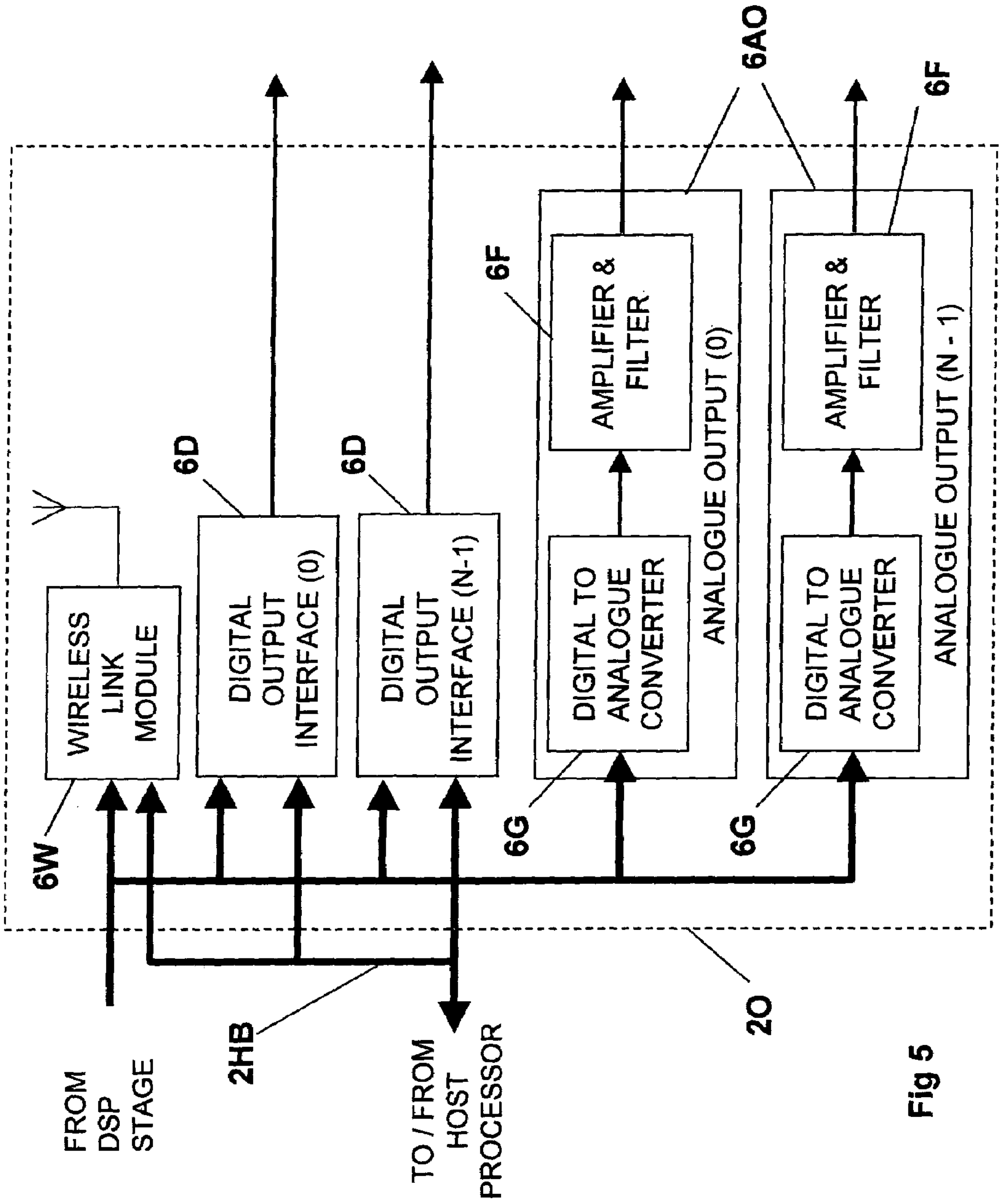
FIG. 5 shows a logical block diagram of the output stage of the pre-amplifier.

FIG. 5 shows a block diagram of the output stage section 2O. This section formats the processed data from the digital signal processing stage 2S for transmission to the selected device. Many of the components in the output stage 2O will need to be initialised and configured to implement the desired interface protocol. These components, such as the wireless link module 6W, the digital output interfaces 6D, are configured by the host processor 7H via the host bus 2HB. Processed digital audio data from the digital signal processing stage 2S can be output in analogue format, digital format or transmitted in a wireless format. The digital output interfaces 6D receive digital data from the digital signal processing stage 2S and format the received data into an appropriate format for transmission to the selected equipment. Depending on the interface and protocol, the format of the digital means that several digital channels can be multiplexed on the one channel. Alternatively, a digital output interface 6D can be provided for each channel.

Many legacy power amplifiers 1P will have analogue inputs. Therefore, signals output from the pre-amplifier apparatus 2 will need to be converted into an analogue form. Consequently, digital signals output from the digital signal processing stage 2S are input to digital to analogue converters 6G, such as an Analog Device AD1857.

The output of each digital to analogue converter 6G is then low pass filtered to "smooth" the signal and then amplified, buffered and impedance matched using circuitry 6F. The digital to analogue converter 6G and the filter and amplifier circuitry 6F can be combined to form an analogue output module 6AO. There will be one analogue output module 6AO per audio channel.

Though a separate power amplifier 1P can be used, the modular and software definable pre-amplifier 2 apparatus can be combined with power amplifier circuitry 1P on the same PCB board or unit.

In some applications, the communication between the pre-amplifier apparatus 2 and other equipment, such as a headset 1H or power amplifier 1P, will be by wireless means. This allows such equipment to be positioned in a remote location. It also means equipment in other locations in a home can utilise the facilities provided by the pre-amplifier apparatus 2 negating the need for more than one pre-amplifier apparatus 2.

Accordingly, digital data output from the digital signal processing stage 2S is input to the wireless link module 6W where it is processed and formatted for transmission to the selected equipment. The wireless protocols used can be DECT or Bluetooth or HomeRF for example, but are not limited to these wireless protocols. As wireless protocols, such as Bluetooth and HomeRF can multiplex many data channels (up to eight for Bluetooth) then the functionality provided by the wireless module 6W could be provided by the other wireless module named in the apparatus. Therefore, wireless blocks 3WM, 7W and 6W are effectively the same wireless module and are shown as different functional blocks in the corresponding diagrams to assist in the explanation of the function of the individual sub-blocks.

In another embodiment, the software and or firmware definable logic blocks can be implemented on daughter cards or mezzanine cards, which can be inserted into the main motherboard. This allows the user to easily expand the pre-amplifier capabilities. For example, the user might have purchased the basic pre-amplifier apparatus 2 initially for use in a hi-fi system, but would now like to use it in a home theatre configuration to implement a surround sound system. By adding extra functions to the main motherboard the pre-amplifier apparatus 2 can be expanded to cater for this new configuration. Other daughter cards or mezzanine cards could include input interface cards and output interface cards allowing more output channels (for example in a so called 5.1 system) to be accommodated.

In yet a further embodiment, the software and or firmware definable logic blocks can be implemented in removable cards, such as a PC TYPE 1/2/3 card. These cards can have programmable functions or fixed functions, such as a modem or Digital Audio Broadcast (DAB) receiver. To reduce the complexity and duplication of circuitry employed in peripheral equipment some of the processing of the received data can be performed by the logic in the pre-amplifier. For example, in conventional Hi-Fi or home entertainment systems separate equipment units employ the same functional blocks to perform certain signal processing. Set Top Boxes (STBs), Digital Versatile Disc (DVD) players and Digital Audio Broadcast (DAB) receivers each use MPEG 2 audio decoders. The pre-amplifier apparatus 2 can be configured to implement MPEG 2 audio decoding. Therefore, Set Top Boxes 1Y, DVD players 1V and DAB receivers 1G, for example, can be manufactured without this circuitry. Consequently, data streams output from these units can be input to the pre-amplifier apparatus 2 which would be able to implement and perform these common functions e.g. MPEG 2 audio decoding. This has the advantage of reducing the cost and complexity of the Set Top Boxes, DVD players and DAB receiver units. FIG. 7 shows the use of "reduced functionality" Set Top Boxes 1Y, DVD players 1V and DAB receivers 1G. In the case of the reduce functionality DAB receiver, the unit only needs to perform the RF demodulation, filtering and decoding to extract the data streams from the DAB modulated signal. Another example of reduced functionality peripherals would be a compact disc transport 1C in which the apparatus implemented the electro-mechanics of spinning and controlling the disc, disc loading and ejection, controlling the read/write head and providing an interface for read/write data streams. The read data stream can then be processed by the software/firmware definable logic circuitry. Likewise, processed write data would be transferred from the apparatus 2 to the compact disc transport 1C for storing on the compact disc media (not shown). The host processor configuring the definable logic and processing elements (software algorithms run on various processors) so the pre-amplifier apparatus 2 is correctly configured to implement the processing circuitry/functions for the desired system configuration.

In another preferred embodiment, the pre-amplifier apparatus 2 can be configured to be used by one or more users simultaneously. With sufficient processing power the apparatus can process signal data from more than one source and transmit it to several separate peripheral devices. For example, the apparatus 2 could process signal data from a DAB receiver apparatus 1G and transfer it to a remote user using a wireless headset whilst simultaneously processing signal data from a compact disc transport 1C and outputting the processed data to a power amplifier 1P.

Figure 4:
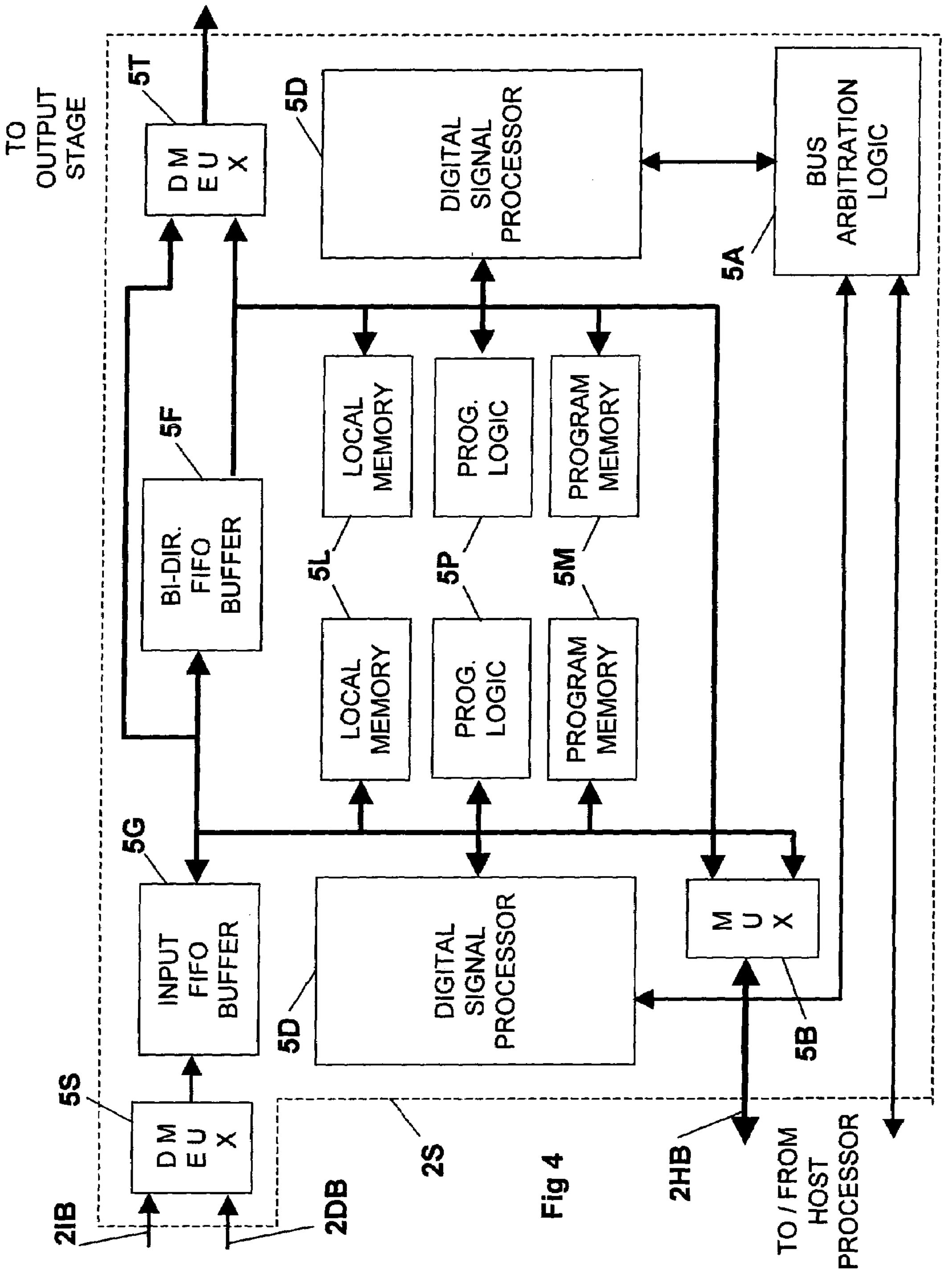
FIG. 4 shows a logical block diagram of the signals processing stage.

FIG. 4 shows a logical block diagram of the digital signal processing stage 2S. The digital signal processing stage 2S comprises one or more digital signal processors 5D. Associated with each digital signal processor 5D is the program memory 5M used to store signal processing programs, local memory 5L used to store parameters used in algorithm/protocol calculations and programmable logic 5P which can be configured in real time or non-real time to implement various hardware functions required to for signal processing algorithms. To allow new software and configuration data, for the programmable logic 5P, to be updated the host processor 7H can gain access to the local memory 5L, the program memory 5M and the programmable logic 5P. To achieve this the host processor 7H must use the bus arbitration logic 5A. The host processor 7H will issue a bus request to the bus arbitration logic 5A. If access is allowed a bus grant signal will be sent back to the host processor 7H. Data is passed to the digital signal processing stage 2S using the host bus 2HB.

The digital signal processing stage 2S accepts data from both the input stage 2I and the data storage section 2M. Data from the data storage section 2M is transferred on bus 2DB. Data from the input stage 2I in transferred on bus 2IB. These two buses are connected to a demultiplexer 5S whose output is connected to an input fifo buffer 5G. The use of a fifo buffer 5G allows data read and write to and from the buffer 5G to be performed in bursts and at different clock rates. This arrangement improves system operation and partitioning by allowing the different sub-blocks to operate at their own rates and reduces complex sub-block communication. Processed data can be transferred to the output stage 2O directly via the demultiplexer 5T or indirectly via the bi-directional FIFO buffer 5F then through the demultiplexer output stage 2O directly via the demultiplexer 5T or indirectly via the bi-directional FIFO buffer 5F then through the demultiplexer 5T. The use of the FIFO 5F allows the separate sub-blocks to operate at their own rates and also allows intercommunication between the digital signal processors 5D.

Though FIG. 1 shows a generic block diagram of the pre-amplifier apparatus other sub-module interconnection methods can be employed.

In one preferred embodiment (not shown), data and control transfer from data sources to data processing and data sinks between the various sub-blocks and card modules is by data packets. These card intercommunications are all digital using serial or differential serial communications links so as to reduce the number of signals and reduce signal noise between the sub-blocks and card modules. Therefore, any analogue signals are first converted to corresponding digital signals using appropriate digital to analogue signal conversion means. The selection of such conversion means ensuring the correct sampling and quantization requirements to represent the digital form of the signal with minimal quantization and noise errors. The data packets preferably being of the same length as used in the Asynchronous Transfer Mode (ATM) protocol or can be varying length packets.

The switching means can take the form of a pure cross bar switch in which signal paths between the switch inputs and switch outputs are dynamically set by the host processor 7H depending on the configuration of the apparatus 2. The switching means can also be a self routing buffered switch fabric in which data packets are transferred from the switch's input ports to the switch's output ports based on routing information contained in the header section of the data packet. As several inputs could route data packets to the same switch output port, buffering is required. To reduce congestion different priority queues could be used in the switch to allow higher priority traffic preference over lower priority traffic. This allows real time traffic and traffic requiring a better class of service to pass through the switch fabric with a lower latency and hence reduce timing errors. The switch paths and header fields are set by the host processor at system start-up or if there is a new configuration update.

The advantages of using a switch to route data packets between different sub-blocks, card modules and devices are that it reduces the complexity of the interconnection. Each card slot does not require connections to all other possible card slot locations. Control and data messages can be switched to the correct sub-block, card module and or device via the switching means. This makes it easier to configure the system and allows the card modules to be placed almost anywhere in the apparatus card slots as the host processor 7H card can interrogate each cards to determine it's function and initialise it and the system accordingly. Also, certain card modules can incorporate Plug'n'Play means, which allows card modules to initialise and or assist in configuring themselves. Another preferable feature is for the card modules to be 'hot swappable'. This feature allows cards to be removed or inserted into the apparatus 2 while the system is operational.

In a preferred embodiment, communication between the signal source peripheral devices (1C, 1D, 1G, 1M, 1N, 1R, 1S, 1T, 1V, 1Y) and the pre-amplifier apparatus 2 can be by wireless means such as Bluetooth or HomeRF.

Likewise, the output from the pre-amplifier apparatus to signal sink or destination apparatus, such as a mobile headset 1H or a power amplifier 1P can be by a wireless protocol. FIG. 7 outlines this system arrangement. The advantage of this is that is removes the need for cumbersome cabling, the equipment is configured automatically using a service directory protocol such as that employed in Bluetooth and a single pre-amplifier apparatus 2 can be used by many remote application situated around the user's home negating the need for many pre-amplifiers for each separate piece of audio equipment.

In yet another embodiment, the apparatus 2 uses microphones 1F to monitor the produced sound output from the apparatus via a power amplifier 1P. These feedback signals can be used by appropriate signal processing algorithms (implemented in the software definable logic and or processing elements such as a DSP or RISC or microprocessor) to adjust the parameters to adapt the output signals to the desired signals. For example, give the impression the music is being played in a concert hall.

The apparatus 2 can also implement signal-processing algorithms to implement reverberation and echo effects. Another signal processing or signal conditioning algorithm will allow the pre-amplifier apparatus 2 to emulate the "sound" of other amplifier. For example, many hi-fi enthusiasts prefer the sound of a valve amplifier. Signal processing algorithms can be used to emulate this particular "valve sound" and so allows the apparatus 2 to sound like a valve amplifier.

Although the invention has been described herein with reference to particular preferred embodiments, it is to be understood that these embodiments are illustrative of the aspects of the invention. As such, a person skilled in the art may make numerous modifications to the illustrative embodiments described herein. Such modifications and other arrangements which may be devised to implement the invention should not be deemed as departing from the spirit and scope of the invention as described and claimed herein.

The invention claimed is:

1. Software definable pre-amplifier apparatus comprising:

(a) input interface means that enables at least one input channel to transfer input data from an external source;

(b) at least one reconfigurable standard cell based circuit means, which are operatively connected to said input interface means to receive said input data, said at least one reconfigurable standard cell based circuit means being continually reconfigured during circuit operation under control of configuration data allowing said reconfigurable standard cell based circuit means to implement, in hardware, different signal processing functions required for at least one of different digital signal processing algorithms and different audio processing protocols, the at least one reconfigurable standard cell based circuit means being reconfigured at a rate that ensures that data input from at least one of a plurality of input channels and output from at least one of a plurality of output channels is processed in accordance with the required sampling rate or sampled data rate in a way that does not cause any signal aliasing and minimizes noise artifacts on any of the operative input and output channels in relation to the selected signal processing functions to be performed;

(c) output interface means that transfer data from the at least one reconfigurable standard cell based circuit means to at least one output channel;

(d) a local memory coupled to said at least one reconfigurable standard cell based circuit means, said local memory storing the configuration data and being operative to supply configuration data to said at least one reconfigurable standard cell based circuit means when a different signal processing function is to be performed; and (e) a host processor and associated program memory means for updating configuration data in said local memory and controlling and monitoring operation of the apparatus.

2. Software definable pre-amplifier apparatus as claimed in claim 1, further Comprising integrated hard disk drive memory means or non-volatile semiconductor memory means or volatile semiconductor memory means for storing and retrieving digitized audio data signals.

3. Software definable pre-amplifier apparatus as claimed in claim 1, further comprising mezzanine or card modules interfaced to said apparatus to allow the apparatus to be expanded or upgraded for use with other protocols or for adding more audio output channels and or accommodating more source channel interfaces, said mezzanine or card modules containing any combination of the following circuitry:

1) Digital Signal Processors,
2) Memory,
3) Programmable Logic Devices (PLDs)
4) Interface logic,
5) Analogues to Digital Converter (ADC),
6) Digital to Analogues Converter (DAC),
7) Small signal amplification and filter circuitry.

4. Software definable pre-amplifier apparatus as claimed in claim 1, further comprising modem means, allowing Internet access so the user can download upgrade firmware or software for implementing new audio protocols or configuring said circuit mean to implement new algorithms and or hardware configurations, the new firmware and software being stored in non-volatile memory under the control of the host processor, the Internet access also allowing the user to download audio information, which is then processed and stored by the apparatus.

5. Apparatus as claimed in claim 1, further comprising facilities to allow removable memory means containing non-volatile memory to be inserted into the apparatus and removed from the apparatus, previously stored data being read from the removable memory means and processed by the apparatus, or processed music data or digitized audio signals, formatted in a selected format, being stored in the non-volatile memory, allowing the user to play the recorded data on another apparatus which has the facilities to access the data stored on the removable memory means.

6. Apparatus as claimed in claim 1, wherein said at least one reconfigurable standard cell based circuit means comprise software or firmware definable logic blocks that are full custom VLSI devices or Application Specific Integrated Circuits (ASICs) which implement any combination of programmable logic, fixed standard cell logic, mixed signal circuitry and processor cores.

7. Apparatus as claimed in claim 1, further comprising input circuitry or output circuitry based on said at least one reconfigurable standard cell based circuit means, allowing interfaces to be reconfigured to implement a desired interface protocol or format.

8. Apparatus as claimed in claim 1, wherein the apparatus is configured for simultaneous use by more than one user where signal data from at least one signal sources is processed and output to separate peripheral units.

9. Apparatus as claimed in claim 1, wherein an external modem means is employed to access the Internet.

10. Apparatus as claimed in claim 1, wherein feedback signals are provided from remote microphone means to allow the signal processor devices to adapt in real time the sound of played music to desired acoustical settings.

11. Apparatus as claimed in claim 1, further comprising analogue to digital converter (ADC) means to allow analogue input signals to be first converted to digital signals and processed in the digital domain, the sampling frequency of the analogue to digital converter means (ADCs) being sufficient to accurately represent the signal in the digital domain.

12. Apparatus as claimed in claim 1, wherein input signals to the apparatus from source means or output signals from the apparatus to signal sink means is by wireless communication means.

13. Apparatus as claimed in claim 12, wherein transfer of data to and from the pre-amplifier apparatus is according to Bluetooth, HomeRF, IEEE 802.11, DECT or Wireless ATM protocol.

14. Apparatus as claimed in claim 3 wherein the mezzanine or card modules have interface means based on said at least one reconfigurable standard cell based circuit means, so that upgrades are easily implemented by changing the interface means of the associated mezzanine or card module.

15. Apparatus as claimed in claim 1, wherein said at least one reconfigurable standard cell based circuit means comprise logic blocks programmed and or configured to implement reverberation and echo effects.

16. Apparatus as claimed in claim 1, wherein said at least one reconfigurable standard cell based circuit means comprise logic blocks programmed and configured to emulate the acoustic characteristics of a valve amplifier and alter the output signals so they sound as if they were produced by a valve amplifier.

17. Apparatus as claimed in claim 1, wherein a personal computer (PC) is connected to allow control of the apparatus, reconfigure the apparatus, diagnose the apparatus or download or upload music data, which are processed or stored in internal memory for future use.

18. Apparatus as claimed in claim 1, wherein remote control means is used to control peripheral signal source apparatus via the pre-amplifier apparatus.

19. Apparatus as claimed in claim 1, wherein digital switching means are employed to route and transfer data from the apparatus.

20. Apparatus as claimed in claim 19, wherein the digital switching means takes the form of a cross bar switch or a self-routing switch in which data packets or cells have an appended routing tag to control the flow of the packets or cells through the switch to their destination.

21. Apparatus as claimed in claim 20, wherein the digital switching means uses priority output queues to allow data with different priorities to be queued in separate queues to reduce congestion and head of line blocking.

22. Apparatus as claimed in claim 19, wherein digital data for transfer via switching means is encapsulated as a variable length data packet or same length cell.

23. Apparatus as claimed in claim 1, further comprising an integrated read/writable compact disc transport and associated control circuitry to allow stored digitized audio data to be read or written to compact disc media.

24. Apparatus as claimed in claim 1, further comprising an integrated read/writable Digital Versatile Disc transport and associated control circuitry to allow stored digitized audio data to be read or written to Digital Versatile Disc media.

25. Apparatus as claimed in claim 1, wherein peripheral units are situated remotely from the pre-amplifier apparatus in which control and data messages are transferred by wireless means allowing movement of the said remote peripheral units to different locations.

26. Apparatus as claimed in claim 3, wherein the mezzanine or card modules incorporate "Plug and Play" means to allow a mezzanine or card module to configure and initialize itself and interact with the host processor to indicate the configuration, status and functionally of the mezzanine or card modules.

27. Apparatus as claimed in claim 3, wherein the mezzanine or card modules incorporate means to be hot swappable, allowing card module insertion or removal from a card frame of the apparatus while the apparatus is operational.

28. Apparatus as claimed in claim 1, wherein some of the at least one reconfigurable standard cell based circuit means are configured to implement functions and algorithms normally performed in peripheral equipment, allowing new peripheral equipment which operates with said modular and software definable pre-amplifier apparatus to have reduced functionality.

29. Apparatus as claimed in claim 1, wherein the apparatus is programmed to record data using "non-volatile" memory means at a predefined time from a peripheral device.

30. Apparatus as claimed in claim 1, wherein said circuit means include digital signal processor devices and associated memory devices, the configuration and allocation of the software programs used by each digital signal processor device being performed in real time by the host processor or configuration routines stored in non-volatile memory associated with the digital signal processor devices, the allocation of the specific software program being determined by user inputs.

31. The apparatus of claim 1, wherein said apparatus is modular.

* * * * *